United States Patent
Sudduth et al.

(10) Patent No.: US 6,224,738 B1
(45) Date of Patent: May 1, 2001

(54) METHOD FOR A PATTERNED ETCH WITH ELECTROLYTICALLY GROWN MASK

(75) Inventors: Katherine Crawford Sudduth; Thomas Flavian Strange, both of Easley, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 0 days.

(21) Appl. No.: 09/437,737

(22) Filed: Nov. 9, 1999

(51) Int. Cl.[7] ................ C25D 5/48; C25F 3/14; C25F 5/00
(52) U.S. Cl. ............ 205/221; 205/223; 205/666; 205/674; 205/684
(58) Field of Search ................ 205/223, 684, 205/674, 138–139, 152–153, 666, 220, 221

(56) References Cited

U.S. PATENT DOCUMENTS

| | | |
|---|---|---|
| 4,213,835 | 7/1980 | Fickelscher ............ 204/129.25 |
| 4,314,874 | 2/1982 | Abe et al. ............ 156/628 |
| 4,420,367 | 12/1983 | Locher ............ 156/651 |
| 4,437,955 | 3/1984 | Shaffer ............ 204/129.4 |
| 4,469,568 * | 9/1984 | Kato et al. ............ 205/223 X |
| 4,474,657 | 10/1984 | Arora ............ 204/129.75 |
| 4,496,419 | 1/1985 | Nulman et al. ............ 156/643 |
| 4,518,471 | 5/1985 | Arora ............ 204/129.1 |
| 4,525,249 | 6/1985 | Arora ............ 204/129.75 |
| 4,589,961 | 5/1986 | Gershenson ............ 204/15 |
| 4,631,112 * | 12/1986 | Usui et al. ............ 205/223 X |
| 4,642,168 | 2/1987 | Imai ............ 204/129.65 |
| 4,676,879 | 6/1987 | Salvadori ............ 204/129.75 |
| 4,968,389 * | 11/1990 | Satoh et al. ............ 205/223 X |
| 5,405,493 | 4/1995 | Goad ............ 156/651 |
| 5,503,718 | 4/1996 | Kakizakai ............ 216/6 |
| 5,522,851 | 6/1996 | Fayram ............ 607/5 |
| 5,660,738 | 8/1997 | Hunter, Jr. et al. ............ 216/17 |
| 5,715,133 | 2/1998 | Harrington ............ 361/500 |
| 5,901,032 * | 5/1999 | Harrington et al. ............ 205/674 X |

* cited by examiner

*Primary Examiner*—Donald R. Valentine
(74) *Attorney, Agent, or Firm*—Steven M. Mitchell

(57) ABSTRACT

This present invention is directed to a method of etching anodic foil for electrolytic capacitors and provides a method of electrolytically growing a porous oxide mask on a surface of a high purity etchable strip of anodic foil for forming etch tunnels at strategic locations on the foil. Unetched high purity aluminum foil is placed in a prepared electrolyte doped with chloride. By passing current through the foil, a porous oxide mask is formed on the surface of the anode foil, with an optimized pore spacing. This oxide mask is then partially removed with a stripping agent in order to expose the underlying anode foil at the bottom of the mask pores to the etch solution. The mask is not removed completely, and the anode foil is exposed only at the pore sites. The foil can then be etched using a conventional etch solution. Etch pits and tunnels form only at the pore sites. The tunnel density is increased by 100%–200% over conventional etching using the described process, thereby increasing the foil capacitance by 100 to 200%.

18 Claims, 2 Drawing Sheets

METHOD FOR A PATTERNED ETCH WITH ELECTROLYTICALLY GROWN MASK

BACKGROUND OF THE INVENTION

1. Field of the Invention

The present invention is directed to a method of etching anodic foil for electrolytic capacitors and more particularly, to a method of growing a porous oxide mask on a surface of a high purity etchable strip of anodic foil for forming etch tunnels at strategic locations on the foil.

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an implantable cardioverter defibrillator (ICD), also referred to as an implantable defibrillator, since the high voltage capacitors used to deliver the defibrillation pulse can occupy as much as one third of the ICD volume.

Electrolytic capacitors are used in ICDs because they have the most nearly ideal properties in terms of size and ability to withstand relatively high voltage.

Conventionally, an electrolytic capacitor includes an etched aluminum foil anode, an aluminum foil or film cathode, and an interposed kraft paper or fabric gauze separator impregnated with a solvent-based liquid electrolyte. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, composing a planar, layered, stack structure of electrode materials with separators interposed therebetween.

Since these capacitors must typically store approximately 30–40 joules, their size can be relatively large, and it is difficult to package them in a small implantable device. Currently available ICDs are relatively large (over 44 cubic centimeters (cc)), generally rectangular devices about 12–16 millimeters (mm) thick. A patient who has a device implanted may often be bothered by the presence of the large object in his or her pectoral region. Furthermore, the generally rectangular shape can in some instances lead to pocket erosion at the somewhat curved corners of the device. For the comfort of the patient, it is desirable to make smaller and more rounded ICDs. The size and configuration of the capacitors has been a major stumbling block in achieving this goal.

In ICDs, as in other applications where space is a critical design element, it is desirable to use capacitors with the greatest possible capacitance per unit volume. Since the capacitance of an electrolytic capacitor increases with the surface area of its electrodes, increasing the surface area of the aluminum anode foil results in increased capacitance per unit volume of the electrolytic capacitor. By electrolytically etching aluminum foils, an enlargement of a surface area of the foil will occur. As a result of this enlargement of the surface area, electrolytic capacitors, which are manufactured with the etched foils, can obtain a given capacity with a smaller volume than an electrolytic capacitor, which utilizes a foil with an unetched surface.

In a conventional electrolytic etching process, surface area of the foil is increased by removing portions of the aluminum foil to create etch tunnels. The foil used for such etching is typically an etchable aluminum strip of high cubicity. High cubicity in the present context is where at least 85% of crystalline aluminum structure is oriented in a normal position (i.e., a (1,0,0) orientation) relative to the surface of the foil. The foil used for etching is also preferably of high purity. Such foils are well-known in the art and are readily available from commercial sources.

The ideal etching structure is a pure tunnel-like etching with defined and uniform tunnel diameters and without any undesirable pitting of the foil. As tunnel density (i.e., the number of tunnels per square centimeter) is increased, a corresponding enlargement of the overall surface area will occur. Larger surface area results in higher overall capacitance.

U.S. Pat. No. 4,213,835 to Fickelscher discloses a method for electrolytically etching a recrystallized aluminum foil which allows manufacture of foils with exclusively pure cylindrical or cubical etching structures and tunnel densities greater than $10^7/cm^2$ with an avoidance of irregular pitting of the foil. The method consists of providing an etching bath containing chloride ions, positioning the foil in the bath and potentistatically etching the foil with a temporally constant anode potential. The preferred etching step occurs in two stages. In the first stage, the etching current density is set above the potential or current density which creates pitting of the aluminum. After an induction period of around 10 seconds, the etching tunnels grow autocatalytically at a rate of several $\mu m/s$ with a pore diameter of approximately 0.2 $\mu m$ in the crystal oriented direction (i.e., a (1,0,0) orientation relative to the surface of the foil). After approximately one minute of exclusive tunnel formation and in order to avoid the occurrence of coarse pitting, the etching current density is reduced. In the second stage, the current density is set below the current density which creates pitting of the aluminum, such that only pore or tunnel enlargement up to the desired value will occur. Thus, the etching time for the tunnel enlargement is relatively long in relation to the etching time for obtaining the tunnel structure in the foil.

U.S. Pat. No. 4,420,367 to Löcher discloses a similar method for etching aluminum foil for electrolytic capacitors. Electrolytic tunnel formation is carried out in a first etching stage, as described above. However, the further etching for tunnel enlargement is non-electrolytic, taking place chemically in one or several etching stages. The method is preferably carried out in a halogen-free or chloride-free solution having nitrate ions, such as $HNO_3$ and/or $Al(NO_3)_3$.

U.S. Pat. Nos. 4,474,657, 4,518,471 and 4,525,249 to Arora disclose the etching of aluminum electrolytic capacitor foil by passing the foil through an electrolyte bath. The preferred bath contains 3% hydrochloric acid and 1% aluminum as aluminum chloride. The etching is carried out under a direct current (DC) and at a temperature of 75° C. U.S. Pat. No. 4,474,657 is limited to the above single step. U.S. Pat. No. 4,518,471 adds a second step where the etched foil is treated in a similar bath with a lower current density and at a temperature of 80–82.5° C. U.S. Pat. No. 4,525,249 adds a different second step, where the etched foil is treated in a bath of 8% nitric acid and 2.6% aluminum as a nitrate, at a temperature of 85° C.

In the first or tunnel forming stage of the above methods for etching aluminum foil for electrolytic capacitors, the number and distribution of the etch tunnels is related to the magnitude of the applied current density and the dissolved amount of the foil is approximately in proportion to the quantity of the electricity applied. Therefore, in order to increase the specific capacitance of the aluminum foil, the current density is set large to form dense tunnels and the quantity of applied electricity is increased to increase the effective surface gain of the foil.

As the etching progresses, the density of the tunnels increases gradually and the unetched part of the foil surface decreases gradually. However, in a conventional tunnel formation step, where the current is applied to the foil under constant conditions for the applied time, tunnel formation is not consistent across the foil surface. As such, formed tunnels are etched excessively while new tunnels are formed, causing portions of the etched foil surface to come off. U.S. Pat. No. 5,503,718 to Kakizakai discloses a two stage method of etching aluminum foil for electrolytic capacitors, as described above, in which the electric current applied during the step of tunnel formation is decreased from a maximum value continuously or stepwise so that the current density for the unetched part is kept approximately constant with the course of time. In this way, the etched surface can be prevented from coming off as the unetched surface is etched and the capacitance per etched amount is improved.

In other known etch processes, the anode foil is pretreated (treated prior to etching) in order to maximize the increase in surface area and improve the distribution of etch tunnels during the subsequent etching steps. A mechanical pretreatment can be applied, such as stroking the surface of the foil with a high speed rotating metal brush to remove a surface layer and uniformly texture the surface of the foil. A chemical pretreatment, such as commercial cleansing agents, acid solutions, or alkaline solutions, can be applied to remove the residual processing oils form the surface of the metal foil and dissolve surface oxides, or replace surface oxides with a new surface film. Alternatively, an electrochemical pretreatment, as disclosed in U.S. Pat. Nos. 4,437,955 to Shaffer and 4,676,879 to Salvadori can be applied to remove a relatively small amount of the surface metal during an initial etch step, as compared to the amount of surface metal removed during the subsequent primary etch step.

A pretreatment process can also consist of depositing a metal film onto the foil surface prior to etching the foil in order to enhance the resulting capacitance of the foil. For example, U.S. Pat. No. 5,405,493 to Goad discloses a method for etching aluminum anode foil in which the foil is pretreated by depositing a discontinuous surface layer of metal that is cathodic to the foil, followed by chemically etching the foil to remove a portion of the deposited metal. Finally, the foil is etched to create the etch tunnels. The discontinuous metal layer, deposited during the first pretreatment step, and the aluminum surfaces exposed by the chemical etching of the second pretreatment step, act as local sites for cathodic reactions during the final etch step, creating a substantial number of etch tunnels near the deposited metal cluster sites.

However, the above disclosed methods, which maintain adequate metal strength and improve capacitance, are not sufficient to produce a foil capable of yielding the very high energy densities (>6 Joule/cm$^3$) needed for advanced ICD designs. There is a need for an improved method for etching anode foil in which tunnel density is increased over conventional etching methods.

SUMMARY OF THE INVENTION

This present invention provides a means of electrolytically growing a porous oxide mask on high purity etchable anode foil used in making anodic foil for electrolytic capacitors, and a method for etching the foil.

Unetched high purity anode foil, preferably high purity aluminum anode foil, is placed in a prepared solvent-based electrolyte bath doped with chloride. The preferred electrolyte comprises boric acid and phosphoric acid in an ethylene glycol solvent base. By passing current through the foil, a porous oxide mask is formed on the surface of the anode foil, with an optimized pore spacing. The foil, with the oxide mask, is then removed from the electrolyte bath, rinsed and air dried.

This oxide mask is then partially removed from the anode foil surface with a stripping agent, in order to expose the underlying anode foil at the bottom of the mask pores to the etch solution. The mask is not removed completely, and the anode foil is exposed only at the pore sites. The preferred stripping agent is either a chromic acid and phosphoric acid solution or a sulfuric acid solution. The anode foil is exposed to the stripping agent for 1 to 1000 seconds. The foil is removed from the stripping agent, rinsed well and dried.

The foil can then be etched using a conventional etch solution. Etch pits and tunnels should form only at pore sites. The tunnel density is increased by 100%–200% over conventional etching using the described process. The increased tunnel density results in foil capacitance 100% to 200% higher than conventionally etched anode foils.

The purpose of the invention is to provide a means of creating a mask on capacitor foil and an etch process that will enable etch tunnels to be formed only at open sites on the mask. In accomplishing this, it will be possible to place etch tunnels at strategic locations on the anodic foil. It is also possible that by etching a tunnel at each open mask site, the tunnel density of the foil will be increased, therefore increasing the foil capacitance by 100 to 200%.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

Figure 1:
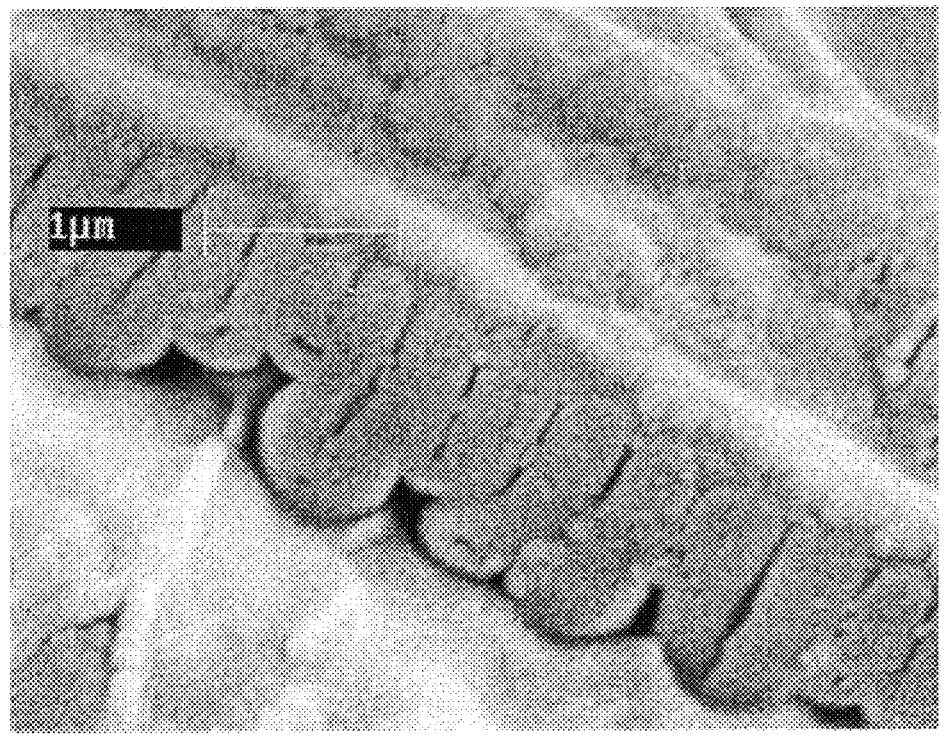
FIG. 1 is a scanning electron microscope (SEM) photograph of a cross section of a porous oxide mask according to the present invention.

The present invention is directed to a method of growing a porous oxide mask on a surface of a high purity etchable strip of anodic foil for use in electrolytic capacitors and a method of etching such foil, wherein the oxide mask enables the placement of etch tunnels at strategic locations on the anodic foil. According to the present invention, etch tunnels will only be formed at open sites on the mask. The invention is also directed to a high capacitance anode foil created by the etch process of the present invention, an electrolytic capacitor incorporating this improved anode foil, and an implantable Cardioverter Defibrillator incorporating this electrolytic capacitor. As a result of increased tunnel formation control, the present invention can be utilized to produce etched anode foils having capacitance values 100% to 200% higher than foils etched according to prior etch processes.

A preferred embodiment of the present invention is now described. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Methods of using masks for forming fine line patterning for submicron devices are known in the art, for example, as disclosed in U.S. Pat. No. 4,314,874 to Abe el al., U.S. Pat. No. 4,589,961 to Gershenson, U.S. Pat. No. 4,642,168 to Imai, and U.S. Pat. No. 5,660,738 to Hunter, Jr. et al. Generally, a metal layer of aluminum, aluminum-silicon alloy, aluminum-copper alloy, or copper to be patterned is formed on a substrate and a mask layer of a predetermined pattern is formed on the metal layer. The metal layer is subjected to electrolytic etching by an etchant through the mask layer for a predetermined period of time, forming a patterned metal layer. The mask layer is etched at a much slower rate than the underlying metal layer, such that the underlying metal layer in the unmasked regions of the substrate is completely etched away before the protective mask is removed. Similarly, U.S. Pat. No. 4,496,419 to Nulman et al. discloses a process for fine line patterning for submicron devices in which a fine line pattern defined on a positive resist is transferred to the mask layer to produce an oxidation mask which is used to control local surface oxidation of an underlying metal film, such as aluminum. The selectively oxidized aluminum film is then etched, leaving a patterned aluminum film corresponding to the initial positive pattern, since the etch rate of the oxidized aluminum film is much less than the etch rate of the unoxidized aluminum film. However, such masking methods have not previously been known for use in etching aluminum foil for use in electrolytic capacitors.

According to the present invention, an anode metal foil to be etched is selected. Aluminum foil is preferred, because of its ability to produce a sufficient quality oxide layer, its conductive properties, and its wide commercial availability. Other foils conventionally utilized in electrolytic capacitors could also be used, including tantalum, titanium, and niobium. Preferably, unetched, high purity (99.99%) aluminum foil with a cubicity of greater than 85% in the <100> direction is used Such foils are well-known in the art and are readily available from commercial sources.

The aluminum foil is placed in a prepared electrolyte bath that is largely nonaqueous, preferably based on a nonaqueous solvent such as ethylene glycol, polyethylene glycol, propylene glycol, butyrolactone, dimethyl sulfoxide (DMSO) dimethyl formamide (DW), glycerol, or butyl cellosolve. The electrolyte may comprise ethylene glycol, water, boric acid and/or an ester of ethylene glycol or other diol and borate ions, phosphoric acid, mannitol, acetic acid, formic acid, or butyric acid as the salt of an ammonia, amine or other suitable base. The preferred electrolyte comprises ethylene glycol, 2%±0.1% by weight water, 27%±5% by weight boric acid, 0.25%±1% by weight phosphoric acid, 12%±1% by weight aqueous ammonia and 9%±2% by weight mannitol. The electrolyte is doped with chloride from 5 ppm to 2000 ppm, with 100 ppm to 200 ppm chloride more preferred. The higher the amount of chloride used, the greater the amount of surface roughness. The electrolyte is heated to a temperature of 10° C. to 100° C., with a preferred temperature of 85° C.

Figure 2:
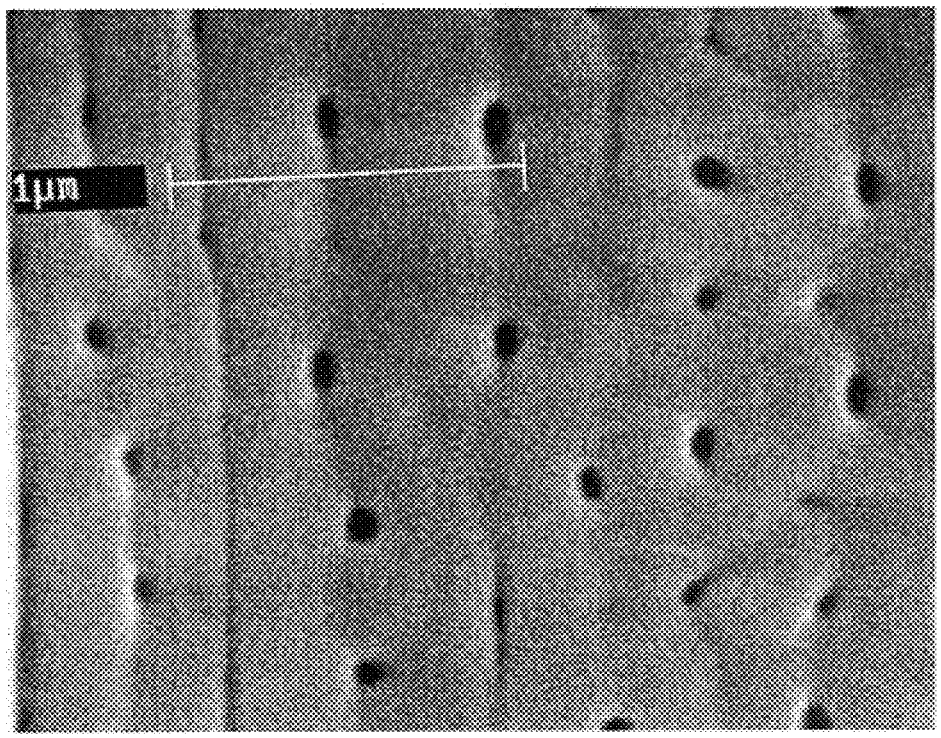
FIG. 2 is an SEM photograph of a foil with a porous oxide mask according to the present invention.

A porous oxide mask, with optimized pore spacing, is formed onto one or both surfaces of the anode foil by placing the foil into the prepared electrolyte bath, applying a positive voltage to the foil and applying a negative voltage to the electrolyte. The current density used can be 0.05 A/cm$^2$ to 1.0 A/cm$^2$, with 0.250 A/cm$^2$ preferred, and the applied voltage for mask formation can be set for 80V to 500V, with 250V preferred. A conventional power supply can be utilized to set the proper voltage and current limits for the mask formation. The foil is left in the prepared electrolyte with the current at the set point (0.05 A/cm$^2$–1.0 A/cm$^2$) and voltage applied until the foil reaches the maximum attainable voltage. The foil is allowed to remain in the prepared electrolyte until the voltage begins to drop. The foil, with the oxide mask, is then removed from the electrolyte bath, rinsed and dried. FIG. 1 and FIG. 2 are Scanning Electron Microscope (SEM) photographs of a foil with an oxide mask formed thereon according to the present invention.

An oxide stripping agent is then used to strip back the oxide formed on the aluminum. The reason for this strip is to thin the oxide layer and to eliminate the oxide at the bottom of the pores in the oxide. Only the sides of the oxide pores should be left, exposing the underlying aluminum foil at the bottom of the pores. This step allows the underlying aluminum foil to be selectively exposed to the etch solution during the etching step, as discussed below. The stripping agent preferably consists of a 2.0% by weight chromic acid, 6.1% by weight phosphoric acid solution in one liter of demonized (DI) water, or a 2.50% to 10.0% by weight of concentrated sulfuric acid solution. The stripping agent is heated to 50° C.–100° C., preferably 70° C. The foil with the oxide mask is exposed to the heated stripping solution for 1 to 1000 seconds, preferably 120 to 240 seconds for the chromic acid/phosphoric acid stripping agent and 720 to 840 seconds for the sulfuric acid stripping agent. Once the foil is removed from the stripping solution, it is rinsed well and air dried.

The foil is then etched in an etch solution according to a conventional etch process; for example, U.S. Pat. No. 5,715,133 to Harrington et al. describes a suitable method of etching foil and is incorporated herein by reference in its entirety. The etch solution preferably consists of 1 to 10% by weight hydrochloric acid, more preferably 5.0% hydrochloric acid, and 10% to 30% sulfuric acid ($H_2SO_4$), more preferably 20% $H_2SO_4$. The etch solution preferably is heated to 60° C. to 95° C., more preferably 82° C. The current density used to etch the foil preferably is 0.01 A/cm$^2$ to 6.4 A/cm$^2$, more preferably 0.07 A/cm$^2$. 10 to 20 coulombs of charge are passed.

Finally, a barrier oxide layer may be formed onto one or both surfaces of the metal foil by placing the foil into an electrolyte bath and applying a positive voltage to the metal foil and a negative voltage to the electrolyte. The barrier oxide layer provides a high resistance to current passing between the electrolyte and the metal foils, also referred to as the leakage current. A high leakage current can result in the poor performance and reliability of an electrolytic capacitor. In particular, a high leakage current results in greater amount of charge leaking out of the capacitor once it has been charged.

An investigation was conducted examining the tunnel density of the foils produced according to the present invention. The tunnel density measurements show that the foils produced in accordance with the present invention exhibit a tunnel density 100% to 200% higher than foils etched according to conventional etching methods. To measure tunnel density, a specified area of the foil, e.g. 100 $\mu m^2$, is measured and the number of tunnels are counted. This number is then multiplied by $10^6$ to give the tunnel density per square centimeter. The increased tunnel density of foils etched according to the present invention indicates increased surface area, resulting in increased foil capacitance by 100% to 200% over conventionally etched foils. The increased tunnel density according to the present invention can be seen in FIG. 3 and FIG. 4, SEM photographs of a cross-ssection of a foil produced according to the present invention. The experiments provided below are exemplary of the etch method described above and are not intended to limit the scope of the present invention.

Anode foils that are processed according to the method of the present invention described above can be utilized for a variety of applications that require a high capacitance anode foil. For example, as discussed above, anode foils are widely utilized in electrolytic capacitors. Since the capacitance of an electrolytic capacitor increases with the surface area of its electrodes, increasing the surface area of the anode foil is useful to increase capacitance per unit volume of the electrolytic capacitor. Electrolytic capacitors, which are manufactured with anode foils etched according to the present invention, can obtain a given capacity with a smaller volume than currently available electrolytic capacitors and, therefore, can be very compact in size. Electrolytic capacitors manufactured with anode foils etched according to the present invention can be utilized in ICDs, such as those described in U.S. Pat. No. 5,522,851 to Fayram, incorporated by reference herein in its entirety, such that the increased capacitance per unit volume of the electrolytic capacitor allows for a reduction in the size of the ICD.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all patents, patent applications and publications mentioned above are incorporated by reference herein.

EXAMPLE 1

A high purity raw foil sample was placed in a prepared electrolyte consisting of ethylene glycol, boric acid, aqueous arnmonia, mannitol and phosphoric acid doped to 100–200 ppm chloride. This electrolyte was heated to 90° C. The voltage applied to the foil was self-limiting and the current was set to 25 mA/cm$^2$. Once the foil reached a maximum voltage (between 235 and 245 V) and began to drop, the foil was removed from the electrolyte.

After rinsing, the sample was placed in a 70° C.–90° C. 5.0% sulfuric acid stripping solution. The foil was exposed to the stripping solution for 12 minutes and rinsed.

After rinsing, the foil was etched in a 5% hydrochloric acid, 20% sulfuric acid etch solution heated to 82° C. The current density used was 0.07 A/cm$^2$ for 143 seconds.

Figure 4:
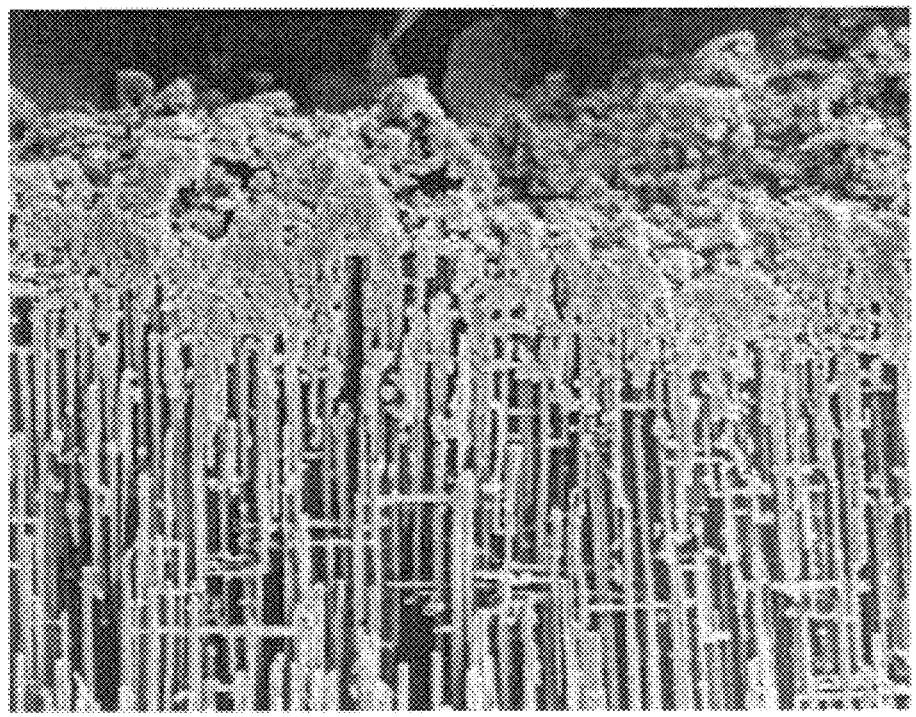
FIG. 4 is an SEM photograph of a cross section of a foil produced according to the present invention.

The foil was rinsed well, dried and a barrier oxide of 250 V was applied in a 500 µS/cm citric acid forming electrolyte at 85° C., and examined with scanning electron microscope in cross section. Tunnel density, as shown in FIG. 4, was observed to locally improve by 100 to 200% over foils etched in the conventional manner as referenced.

EXAMPLE 2

A high purity raw foil sample was placed in a prepared electrolyte consisting of ethylene glycol, boric acid, aqueous ammonia, mannitol and phosphoric acid doped to 100 ppm–400 ppm chloride. This electrolyte was heated to 90° C. The voltage applied to the foil was self-limiting and the current was set to 25 mA/cm$^2$. Once the foil reached a high voltage and began to drop, the foil was removed from the electrolyte.

After rinsing, the sample was placed in a 80° C. chromic acid/phosphoric acid stripping solution. The foil was exposed to the stripping solution for 2 minutes and rinsed.

After rinsing, the foil was etched in a 5% hydrochloric acid, 20% sulfuric acid etch solution heated to 82° C. The current density used was 0.07 A/cm$^2$ for 143 seconds.

Figure 3:
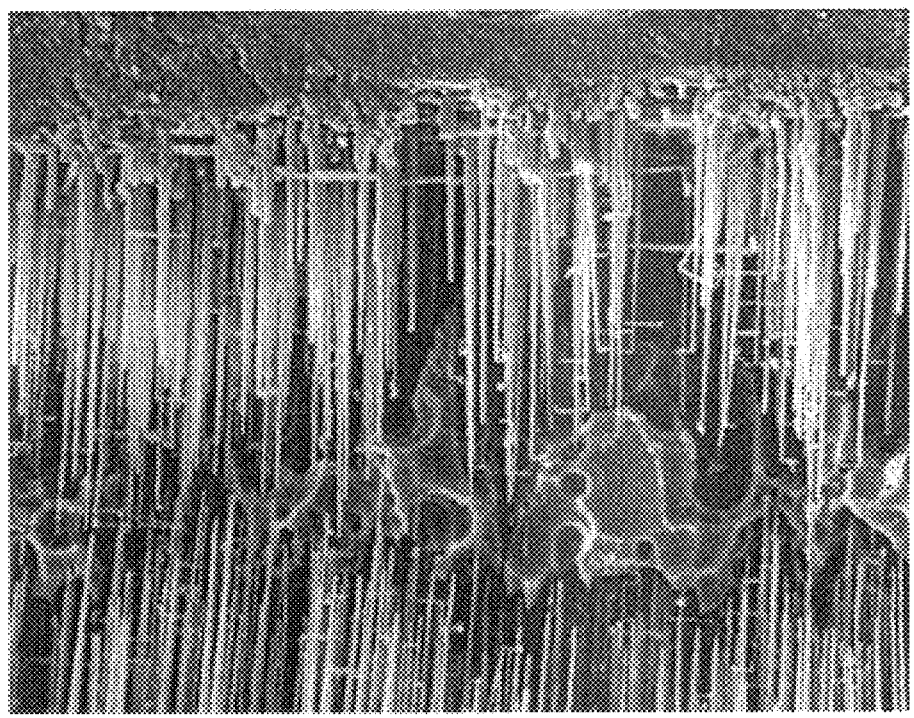
FIG. 3 is an SEM photograph of a cross section of a foil produced according to the present invention.

The foil was rinsed well, dried and a barrier oxide of 250 V was applied in a 500 µS/cm citric acid forming electrolyte at 85° C., and examined with scanning electron microscope in cross section. Tunnel density, as shown in FIG. 3, was observed to locally improve by 100 to 200% over foils etched in the conventional manner.

All references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A process for etching an anode foil, comprising:
   (a) placing an unetched anode foil in a chloride doped solvent based electrolyte;
   (b) passing a current through said anode foil to form a porous oxide mask on a surface of said foil;
   (c) partially removing said oxide mask with a stripping agent to expose said anode foil; and
   (d) etching said anode foil.

2. A process according to claim 1, wherein said solvent based electrolyte is selected from the group consisting of: ethylene glycol, polyethylene glycol, propylene glycol, butyrolactone, dimethyl sulfoxide, dimethyl formamide, glycerol, or butyl cellosolve.

3. A process according to claim 1, wherein said solvent-based electrolyte comprises boric acid aqueous ammonia, mannitol and phosphoric acid in an ethylene glycol solvent base.

4. A process according to claim 1, wherein said solvent-based electrolyte is doped with chloride from 5 ppm to 2000 ppm.

5. A process according to claim 1, wherein said anode foil comprises aluminum anode foil.

6. A process according to claim 1, wherein the current density in step (b) is 0.05 A/cm$^2$ to 1.0 A/cm$^2$.

7. A process according to claim 1, wherein the applied voltage in step (b) is 80V–250V.

8. A process according to claim 1, wherein step (b) further comprises passing a current through said anode foil until said anode foil reaches a maximum attainable voltage.

9. A process according to claim 1, wherein said stripping agent comprises a chromic acid and phosphoric acid solution.

10. A process according to claim 1, wherein said stripping agent comprises a sulfuric acid solution.

11. A process according to claim 1, wherein said anode foil is exposed to said stripping agent for 1 to 1000 seconds during step (c).

12. A process for etching an anode foil, comprising:
- (d) placing an unetched anode foil in a chloride doped solvent based electrolyte;
- (e) passing a current through said anode foil to form a porous oxide mask on a surface of said foil;
- (c) removing said anode foil from said electrolyte, rinsing and drying said anode foil;
- (d) placing said anode foil in a stripping agent;
- (e) partially removing said oxide mask with said stripping agent to expose said anode foil;
- (f) removing said anode foil from said stripping agent, rinsing and drying said anode foil;
- (e) etching said anode foil.

13. Etched anode foil, provided by a process for etching anode foil, comprising:
- (a) placing an unetched anode foil in a chloride doped solvent based electrolyte;
- (b) passing a current through said anode foil to form a porous oxide mask on a surface of said foil;
- (c) partially removing said oxide mask with a stripping agent to expose said anode foil; and
- (d) etching said anode foil.

14. Etched anode foil according to claim 13, wherein said solvent-based electrolyte comprises boric acid, aqueous ammonia, mannitol and phosphoric acid in an ethylene glycol solvent base.

15. Etched anode foil according to claim 13, wherein said solvent-based electrolyte is doped with chloride from 5 ppm to 2000 ppm.

16. Etched anode foil according to claim 13, wherein said anode foil comprises aluminum anode foil.

17. Etched anode foil according to claim 13, wherein said stripping agent comprises a chromic acid and phosphoric acid solution.

18. Etched anode foil according to claim 13, wherein said stripping agent comprises a sulfuric acid solution.

\* \* \* \* \*